United States Patent [19]

Prinz

[11] 4,390,260
[45] Jun. 28, 1983

[54] PLAY CONTROL FOR A THREADED DRIVE

[75] Inventor: Reinhard Prinz, Aalen, Fed. Rep. of Germany

[73] Assignee: Carl Zeiss-Stiftung, Oberkochen, Fed. Rep. of Germany

[21] Appl. No.: 287,046

[22] Filed: Jul. 27, 1981

[30] Foreign Application Priority Data

Aug. 13, 1980 [DE] Fed. Rep. of Germany ....... 3030549

[51] Int. Cl.$^3$ .......................... G03B 3/00; G02B 7/04; H02P 7/04
[52] U.S. Cl. ...................................... 354/65; 354/195; 350/253; 350/255; 318/324; 318/372; 318/614; 318/689; 192/2; 74/424.8 A; 24/20 R
[58] Field of Search ..................... 354/25 N, 60 A, 65, 354/195, 66; 350/253, 255; 318/324, 372, 614, 653, 675, 689; 188/75, 186, 181 T; 292/256.6, 256.65, 256.67; 192/1, 2, 9; 74/411.5, 424.8 A; 411/265–267, 270, 433, 434; 24/19, 20 R, 22, 27

[56] References Cited

U.S. PATENT DOCUMENTS

| | | | |
|---|---|---|---|
| 983,047 | 1/1911 | Grant | 354/195 |
| 2,257,610 | 9/1941 | Kraft | 192/2 |
| 2,363,409 | 11/1944 | Gibson | 354/195 |
| 2,905,289 | 9/1959 | Lee et al. | 192/2 |
| 4,182,979 | 1/1980 | Douglas et al. | 318/689 X |

*Primary Examiner*—William B. Perkey
*Attorney, Agent, or Firm*—Hopgood, Calimafde, Kalil, Blaustein & Judlowe

[57] ABSTRACT

The invention contemplates a precisely adjustable threaded mechanism, as for focus adjustment of an aerial camera lens, wherein inner and outer threaded members are normally in circumferentially continuous radially stressed play-free engagement to the extent of requiring a characteristic maximum torque for their rotary adjustment. One of these members is continuously excitable (with respect to the other) as to so incrementally change its circumferential extent with respect to the circumferential extent of the other of said members that their characteristic engagement torque is reduced from said maximum. And a rotary-drive torque of a level less than said maximum engagement torque but greater than the reduced engagement torque is operative to impart an incremental thread-advancing rotary drive, during such intervals as the engagement torque is thus reduced.

13 Claims, 4 Drawing Figures

PLAY CONTROL FOR A THREADED DRIVE

BACKGROUND OF THE INVENTION

The present invention relates to a device for the highly accurate adjustment of two parts which are in play-free threaded engagement, such as for instance the mounts of optical elements which are displaced for purposes of focusing.

Such threads are, in general, made free of play by being clamped axially against each other, for instance by means of springs; this measure is sufficient in most cases, particularly when threads of small diameter are concerned and no extreme demands are made on the accuracy of positioning and centering.

With an increase in the diameter of the thread and increasing demands on the precision of centering, the friction in the thread, however, increases to such an extent that adjustment is possible only with the expenditure of unreasonably great force. In the case of spring-clamped thread parts there is, furthermore, always the danger that, in the presence of strong vibration, forces will temporarily occur which impermissibly reduce or even entirely neutralize the spring-clamping force. The position of parts fastened to the thread is then no longer maintained with the required precision, which, in the case of optical parts, means a defocusing of the system.

A further possibility of reducing thread play in the prior art consists in individually grinding the threaded parts with polishing agents. Aside from the rather high manufacturing expense involved in this method, the parts to be ground must consist of different materials in order to prevent their "seizure" in later operation. However, since different materials have different coefficients of thermal expansion, the temperature range within which such threads are free of play is very greatly limited, particularly in the case of large diameters.

Threads are known which are made free of play by balls inserted under compression between rotatable parts. However, such ball-rotation spindles considerably increase the size of the thread. Furthermore, due to the fact that the balls must have a given minimum diameter to sustain surface pressure under load, the pitch of thread advance cannot be reduced, at will, to the value required, for instance, for fine threads, so that ball-thread applications are limited.

BRIEF STATEMENT OF THE INVENTION

The object of the present invention is to assure the adjustment of a threaded engagement while satisfying the highest requirements as to accuracy of the adjustment and centering of the involved rotatable parts.

The invention achieves this object by providing at least one ring to clamp the thread-engaged parts by purely radially directed forces, while in an at-rest condition; in addition, means are provided for changing the diameter of the ring, and the latter is so operatively connected with the thread-adjustment drive that adjustment is effected after change of the ring diameter and with the thread unclamped.

The thread engagement, which is normally ring-clamped, is therefore unclamped only for adjustment and is then clamped again, once the desired final adjustment position has been reached. The clamping is by purely radial forces which are distributed with circumferential uniformity, thereby providing highly precise centering of the rotatable parts with respect to each other. Thread adjustment is easily effected in the unclamped condition, and any decentering of the unclamped threads during an adjustment is, in general, not disturbing and does not influence final position of the threaded parts, since re-clamping at the adjusted position restores the centered relation of the parts.

The invention is to be distinguished from mechanical clamping of threaded parts, wherein clamp action is applied to discrete points of the circumference of the thread; in such a case, the centering action of the invention cannot be obtained, due to friction between clamping and clamped parts and the concomitant tangential forces which then occur, to exert a decentering action.

In conventional thread engagements, wear leads to an undesired increase in thread play; on the other hand, with the invention, wear is not only reduced to a minimum by making adjustments only when in the unclamped condition, thereby substantially avoiding friction, but in the clamped condition the threaded parts are so tightly clamped together as to preclude looseness attributable to slight wear.

It is advantageous to configure the clamping ring as a tightening ring, around the female thread, i.e., the threaded element having the internal thread. The clamping ring is then easily accessible and can be connected without difficulty to the means for changing its diameter. And by slitting the female thread, the transfer of clamping-ring force to the engaged externally threaded part is improved.

Instead of placing the clamp ring around the internally threaded member, it is also possible to integrate the clamp-ring function into one of the two threaded parts or to provide both threaded parts with rings, the outer ring expanding for purposes of unclamping, while the inner ring at the same time contracts. This result may be obtained, for instance, by inserting separate rings, of positive and negative magnetostriction material, respectively, to the corresponding threaded parts, both rings being under the influence of the same magnetic field, the latter being established by electronic means. But regardless of the physical property utilized for development of clamp action, it need merely be made certain that the forces acting on the engaged threads are directed radially, so as to exert a centering effect.

Thus, the uniformly distributed radially directed forces required for clamping and unclamping can be thermally produced to particular advantage, by heating or cooling the ring in question.

If the tightening ring is of aluminum and is mounted around a female thread, only a temperature rise of a few °K. needed to produce the change in circumferential length required for unclamping, and such a small temperature rise can be produced without great expense by an electric heating ribbon mounted around the tightening ring.

The heating power necessary for the adjustment and the time constant of the tightening process depend essentially on the thermal capacity of the tightening ring and the heat-transfer resistance between the heated ring and the female thread. By the insertion of an additional incompressible intermediate layer between the tightening ring and the female thread, and by selection of the material of the intermediate layer so as to impair or to improve heat transmission, one may either reduce the heatng-power requirement or one may shorten the time required for the ring to pass from its unclamped and into its elastically clamped condition.

Preferably, the two thread-engaged parts of the adjustment mechanism and the tightening ring consist of the same material or of materials having the same coefficient of thermal expansion, to assure that clamping force is independent of ambient temperature.

The invention can therefore be used to advantage in adjusting the focus of aerial cameras. In aerial photography, the high precision required for adjustment and centering of focusing lens members have heretofore precluded a change of focus during photographic flight. Rather, the exact focusing of the cameras had to be effected before each flight, based on the contemplated distance from the object to be phtographed (altitude of flight) and the environmental conditions, such as air pressure and temperature, which affect the focusing and thus the resolution of aerial photographs. The defocusing influence of these parameters, the exact altitude-dependent values of which are generally not known, was then avoided, if at all, by controlling the temperature of the entire camera. Such a stabilization of focus operates only very slowly and is very expensive since the entire camera, with its high thermal capacity, must be brought to a uniform temperature.

By means of the invention, which permits a precisely centered and nevertheless easily moving thread adjustment, it is not possible, by displacement of an optical element, to effect in-flight adjustment of focus and to compensate for the defocusing influences of air pressure and surrounding temperature.

For this purpose, the output signals of sensors for these parameters (the sensors being arranged on the aerial camera) and the output signal of a position indicator coupled with the optical element are compared with each other. From the comparison, it is possible to obtain a control signal with which an optical element that is adjustably thread-mounted in the camera is always so positioned, for thus-sensed existing pressure and temperature values, as to enable aerial photographs having maximum obtainable resolution.

An advantageous embodiment of the invention utilizes an electric motor to reset (adjust) the optical-element position. A control circuit monitors the torque-dependent current consumption of the motor to determine the clamped condition of the engaged threads, and if such current is of more than a predetermined tolerance level, the control circuit supplies heating current to the tightening ring, thereby releasing the clamp action.

For manual unclamping, a piezo-electric pressure pickup may be used to produce an output signal which serves to connect power to the heating element.

DETAILED DESCRIPTION

Figure 1:
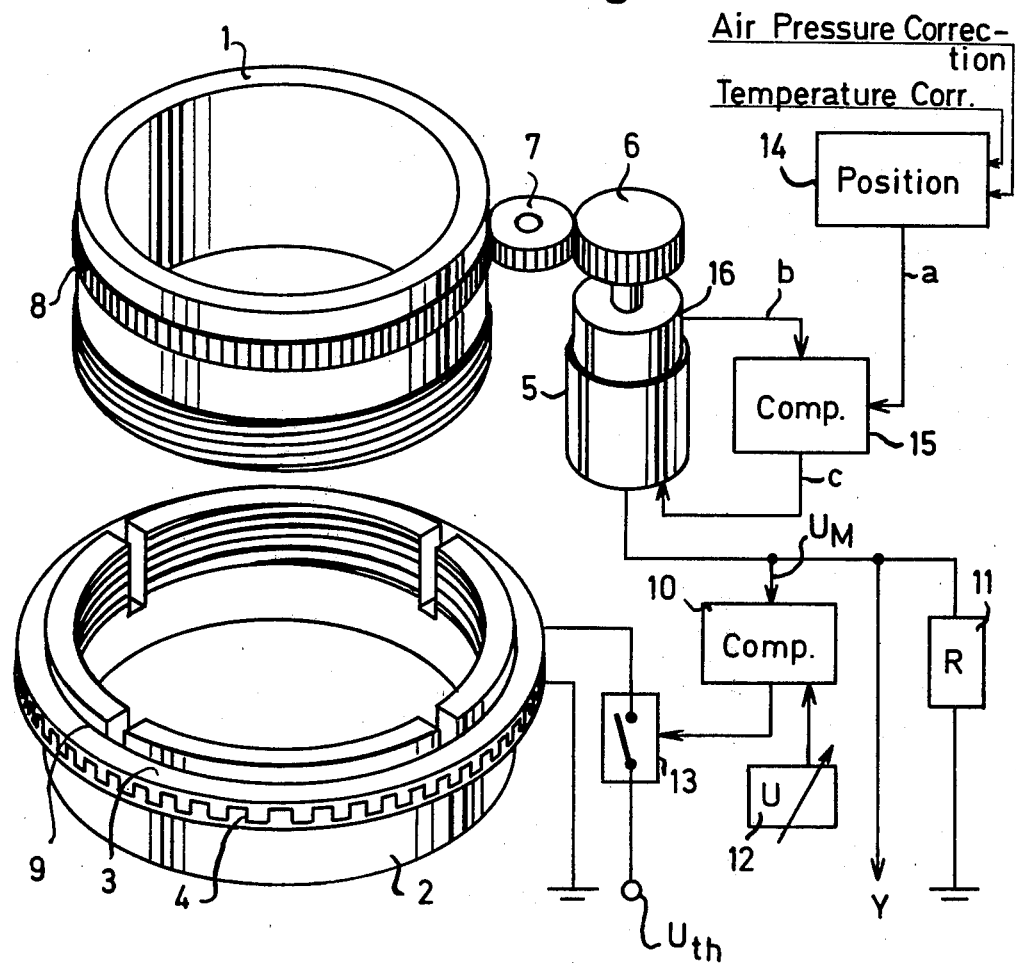
Figure 2:
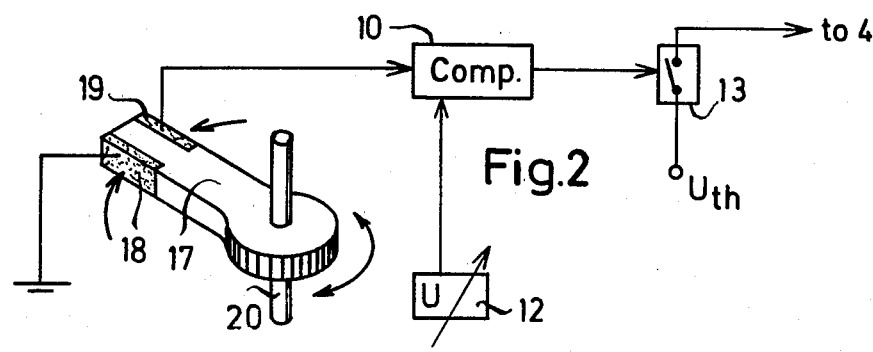
Figure 3:
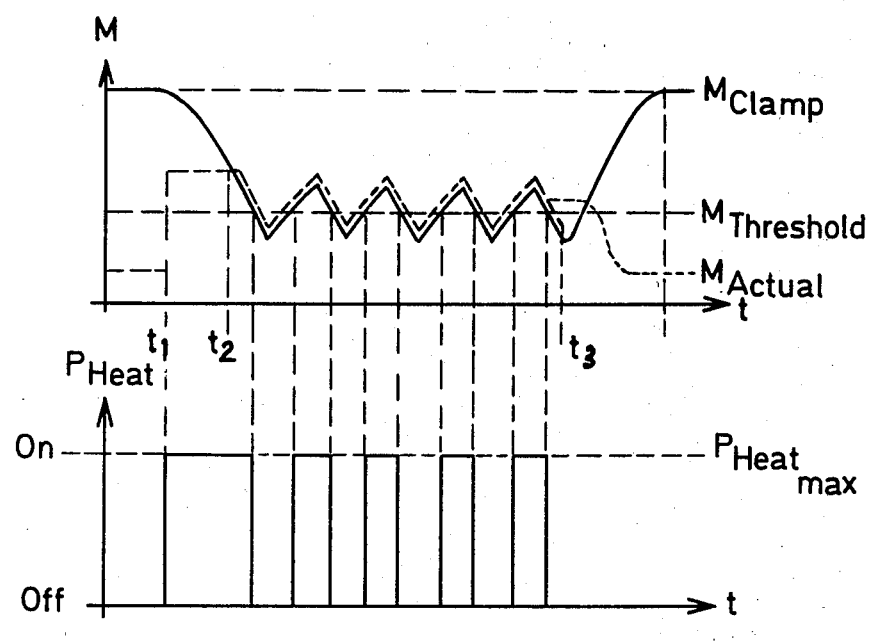
Figure 4:
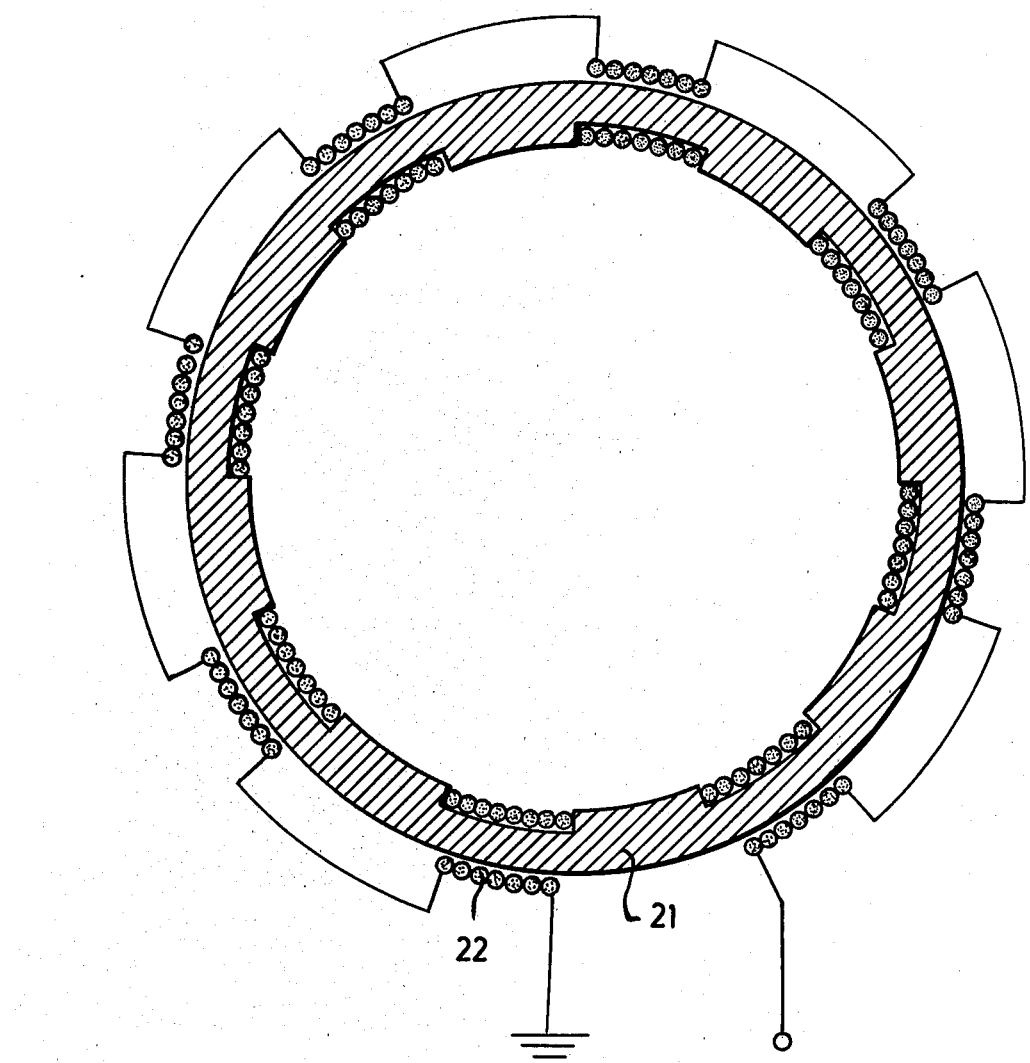

The invention will now be illustratively described in further detail, in reference to the accompanying drawings, in which:

FIG. 1 diagrammatically shows the development of a thermally clampable thread mechanism and of an automatically operating adjustment device, the male and female thread elements of the mechanism being shown in exploded perspective;

FIG. 2 is a perspective view of a lever for manual adjustment of the thread mechanism of FIG. 1;

FIG. 3 graphically depicts the time variation of torque necessary for an adjustment of the thread mechanism and the heating power necessary for thread unclamping, for an adjustment cycle effected by the device of FIG. 1; and FIG. 4 illustrates a magnetostrictive alternative for the thermally clampable mechanism of FIG. 1.

The adjustment-thread mechanism of FIG. 1 comprises a male-threaded sleeve 1 having peripheral gear teeth 8, and an internally or female-threaded sleeve 2 around which a tightening ring 3 is mounted. For the sake of clarity, the sleeves 1 and 2 have been shown in exploded relation; in their normal condition, sleeves 1 and 2 are in threaded engagement and are firmly clamped to each other by the tightening ring 3.

A suitably insulated heating wire 4 is carried by the tightening ring 3. The wire 4 is supplied with current, controlled by a control unit described below, as a result of which the tightening ring 3 is heated and expands, and accordingly the friction between the sleeve 1 and the internal thread 2 is reduced to such an extent that the sleeve 1 can be rotated by a motor 5, via drive gearing 6–7 which engages teeth 8.

Between the parts 2 and 3, which are of aluminum, there is an eloxal layer 9 whose thickness affects the heat-transfer resistance between tightening ring 3 and the internally threaded member 2; for a predetermined area of contact between the parts 2–3, the layer 9 can be used to optimize the thermal time constant of the thus-combined female-thread ring.

To effect specific adjusting displacement, motor 5 is provided with a position transducer 16 whose output signals are compared in a control circuit 15 with the signals of a set-point value transmitter 14.

In the circuit of motor 5 is a resistor 11 whose voltage drop ($U_M$) is compared in a second control circuit 10 with the adjustable set-point voltage (U) of a transmitter 12. A signal obtained from the comparison serves to control a relay switch 13 for voltage ($U_{th}$) to be applied to the heating wire 4.

The manner of operation of the adjustment device of FIG. 1 will now be described, with additional reference to FIG. 3.

The thread engagement is so strongly clamped in at-rest position by the tightening ring 3 that it can be driven in rotation only by application of very high torque ($M_{clamp}$), beyond the capability of motor 5 to provide. If the sleeve 1 is to be repositioned with respect to the female-thread sleeve 2, then the comparator 15 (by comparing the output signal of rotary transducer 16, which characterizes actual position, with the output signal of transmitter 14, which characterizes the set-point position) supplies a control signal which attempts to drive motor 5. At this time $t_1$, motor 5 begins to exert a torque (M) on sleeve 1, and a voltage drop proportional to this torque develops across resistor 11 in the motor circuit; this voltage drop will be understood to lie above the value set at threshold transmitter 12. This circumstance (at $t_1$) is recognized by comparator 10, which produces an output signal for the actuation of switch 13 (from "Off" to "On"), via which heater wire 4 is provided with excitation voltage.

Thereupon, the tightening ring 3 develops heat and expands, so that the torque ($M_{clamp}$) required for rotary adjustment of the thread engagement decreases. As soon as the torque ($M_{clamp}$) has dropped (at time $t_2$) below the maximum value of motor-developed torque ($M_{actual}$), sleeve 1 begins to rotate, and motor torque drops to a value which lies below the threshold torque ($M_{threshold}$) determined by the setting of transmitter 12. Thereupon, comparator 10 disconnects switch 13 to cut off excitation to the heat 4, and ring 3 still expands somewhat (as a result of the thermal time constant of the system) and then contracts; with such contraction, the torque required for thread adjustment begins to rise. Once the threshold torque established by the transmitter 12 is again reached, the heater excitation is again connected, and ring 3 is again unclamped. This process is repeated periodically, the duration of the periods being determined by the thermal time constant of the system, until at a later time $t_3$, the end of the fully adjusted thread displacement has been reached. Motor 5 thereupon disconnects itself, the voltage drop over the resistor 11 becomes zero, and, due to the cooling of ring 3, clamping torque ($M_{clamp}$) within seconds again attains its original relatively high level.

It follows from the foregoing that thread play present during the rotary adjustment or the operative torque threshold ($M_{threshold}$) can be selectably set at transmitter 12 and that it can be adapted to the output-torque characteristic of the motor 5.

Of course, the thread adjustment can also be effected manually. FIG. 2 shows a lever (with gear-toothed hub) which can be used instead of gear 7 to rotate sleeve 1, for small corrective increments, in whatever rotational direction is desired. Lever 17 is rotatable about a shaft 20, and it has two piezo elements 18 and 19, for finger-applied pressure; finger pressure on either or both of elements 18-19 produces an output signal to the comparator 10, for controlled excitation of element 4 for heating ring 3. And when ring 3 becomes sufficiently heated to reduce clamping torque below threshold torque, continued finger torque applied to lever 17 in the desired direction will be effective to impart an increment of driven rotary displacement to sleeve 1, via the gear-tooth hub of lever 17.

Instead of the tightening aluminum ring 3 of FIG. 1, which serves for thermal declamping of sleeve parts 1 and 2, a ring 21 shown in FIG. 4 may be used, to utilize controlled magnetostrictive forces for selective clamping and declamping of the engaged sleeve parts 1 and 2. Ring 21 may consist of ferrite material having a positive magnetostrictive coefficient. Eight like electrical windings 22 are shown wound to ring 21 at equal circumferentially distributed locations; these windings 22 are wired together and thus establish a nearly uniformly distributed magnetic field in ring 21 as soon as they are energized, as by the energizing circuitry described for wire 4 in FIG. 1.

As soon as current flow is thus established in windings 22, ring 21 expands and declamps sleeve parts 1 and 2, allowing motor or finger developed torque to impart incremental drive rotation to sleeve 2 in a manner analogous to that described in connection with FIG. 3. Of course, the response time to magnetostrictive excitation is much faster than that for thermal excitation, and therefore the frequency of winding excitation (e.g., during the internal corresponding to $t_2$ to $t_3$ in FIG. 3) will be more rapid; specifically, the time constant which determines the frequency of winding (22) excitation will be more a function of the rotational inertia of parts 1, 5, 6, 7 than of any magnetostrictive analog to the thermal inertia of the FIG. 1 system.

It has been indicated that the invention has important application in an aerial-camera environment, in which case the sleeve 1 will be understood to be an adjustable lens-supporting member, while the sleeve 2 is suitably mounted for fixed reference to (i.e., as a part of) the housing of the camera. Also, it will be understood that, in such an application, environmental-sensing instrumentation may provide continuously available output signals for automatic correctional control of the position transmitter 14, such instrumentation being in FIG. 1 illustratively suggested by input connections labeled "Air Pressure Correction" and "Temperature Corr.", respectively.

What is claimed is:

1. The method of adjusting the engaged relation of one with respect to the other of inner and outer threaded members which are normally in circumferentially continuous radially stressed play-free engagement to the extent of requiring a characteristic maximum torque for their rotary adjustment, which method comprises selecting a stalled-torque electric motor and coupling the same in torque-transmitting relation with said one member, said motor being selected for a stalled-torque magnitude less than said characteristic maximum torque, exciting said motor and monitoring its current consumption, supplying electrically controlled thermal treatment to a first to the exclusion of the second of said members in the sense to reduce the characteristic engagement torque from said maximum, terminating said thermal treatment when the characteristic engagement torque reduces to a level predetermined to be less than the stalled torque of said motor, whereby the motor will then drive said one member in rotation at reduced current consumption until said first member dissipates its thermal treatment to the extent that said characteristic engagement torque again reaches said predetermined level, whereby said motor becomes inoperative to further drive said one member and monitored motor current is again observed to rise, and repeating the cycle of thermal treatment in interlace with motor drive until a desired rotary advance has been imparted to said one member, and then terminating the excitation of said motor, whereby thermal treatment of said first member may then totally dissipate and the normal play-free stressed engagement of said members will become reestablished.

2. The method of adjusting the engaged relation of one with respect to the other of inner and outer threaded members which are normally in circumferentially continuous radially stressed play-free engagement to the extent of requiring a characteristic maximum torque for their rotary adjustment, which method comprises selecting a stalled-torque electric motor and coupling the same in torque-transmitting relation with said one member, said motor being selected for a stalled-torque magnitude less than said characteristic maximum torque, exciting said motor and monitoring its current consumption, supplying electrically controlled thermal treatment to a first to the exclusion of the second of said members in the sense to reduce the characteristic engagement torque from said maximum, said thermal treatment being at least sufficient to reduce the engagement torque to less than said stalled-torque magnitude, thereby enabling said motor to impart a rotary adjustment of said threaded members.

3. The method of adjusting the engaged relation of one with respect to the other of inner and outer threaded member which are normally in circumferentially stressed play-free engagement to the extent of requiring a characteristic maximum torque for their rotary adjustment, the outer of said members including a circumferentially continuous ring of magnetostrictive material having a positive magnetostrictive coefficient, which method comprises selecting a stalled-torque electric motor and coupling the same in torque-transmitting relation with said one member, said motor being selected for a stalled-torque magnitude less than said characteristic maximum torque, exciting said motor and monitoring its current consumption, and using the monitored current consumption to induce a flow of magnetic flux in said ring to an extent sufficient to reduce to less than said stalled-torque magnitude, thereby enabling said motor to impart a rotary adjustment of said threaded members.

4. A precisely adjustable threaded machanism, comprising inner and outer threaded members which are normally in circumferentially continuous radially stressed play-free engagement to the extent of requiring a characteristic maximum torque for their rotary adjustment, one with respect to the other of said members being circumferentially continuously excitable to so incrementally change its circumferential extent with respect to the circumferential-extent of the other of said members that their characteristic engagement torque is reduced from said maximum, and intermittently operable means for thus exciting said one member to reduce said engagement torque and for imparting thread-advancing rotary drive torque to one with respect to the other of said members, said rotary-drive torque being at a maximum level which is less than said maximum engagement torque but which exceeds the reduced level of engagement torque in a period of such excitation.

5. A precisely adjustable threaded mechanism, comprising inner and outer threaded members which are normally in circumferentially continuous radially stressed play-free engagement to the extent of requiring a characteristic maximum torque for their rotary adjustment, one with respect to the other of said members being circumferentially continuously excitable to so change its circumferential extent with respect to the circumferential-extent of the other of said members that their characteristic engagement torque is reduced from said maximum, and means for thus exciting said one member to reduce said engagement torque and for imparting thread-advancing rotary drive torque to one with respect to the other of said members, said rotary-drive torque exceeding the reduced level of engagement torque in a period of such excitation.

6. Mechanism according to claim 5, in which said one circumferentially excitable member is the outer member and comprises an elastic part having an inner thread, and an excitable-ring part circumferentially around said elastic part.

7. Mechanism according to claim 5, in which said circumferentially excitable member is a ring of magnetostrictive material, and means for producing a magnetic field of variable strength at the location of the ring to change the circumferential extent of the ring.

8. Mechanism according to claim 5, in which said circumferentially excitable member is a ring which includes a heater for changing the circumferential extent of the ring.

9. Mechanism according to claim 5, in which said means for imparting rotary-drive torque is an electric motor, and in which the means for exciting said one member includes means responsive to the current consumption of said motor.

10. Mechanism according to claim 8, in which said member is the outer member and said ring comprises an elastic sleeve part having an inner thread, a tightening part which mounts said heater and surrounds said sleeve part, and an incompressible intermediate layer between said sleeve part and said tightening part, said intermediate layer being of a material whose thickness affects the heat-transfer resistance between said parts.

11. Mechanism according to claim 10, in which said sleeve part and said tightening part are of the same material.

12. Mechanism according to claim 5, characterized by its use for the positioning of optical elements of large diameter.

13. A device according to claim 12, characterized by its use for correcting the focus of aerial cameras in that sensors for the measurement of those parameters which determine the focal position, such as air pressure and temperature, are provided as well as means (14, 15) which converts the output signals of the sensors into a signal (a) corresponding to the desired position of the mount (1) of an adjustable lens member and compares it with the signal (b) of a position indicator (16) which is connected to the lens member in order to produce a control signal (c) which acts on a reset motor (5) and serves for the unclamping of the thread.

* * * * *